US012556568B2

(12) United States Patent
Lima et al.

(10) Patent No.: US 12,556,568 B2
(45) Date of Patent: Feb. 17, 2026

(54) MULTI-OBJECTIVE COMPUTER INFRASTRUCTURE VULNERABILITY PRIORITIZATION

(71) Applicant: Dell Products L.P., Round Rock, TX (US)

(72) Inventors: Leomar Comparin Lima, Porto Alegre (BR); Marcio Augusto de Araujo Borges, Porto Alegre (BR); Karine da Rosa Heinen de Azambuja, Capao da Canoa (BR); Felipe Colombelli, Porto Alegre (BR); Vitor Kehl Matter, Nova Petropolis (BR); Sandro Jose Rigo, Porto Alegre (BR); Rodrigo da Rosa Righi, Sao Leopoldo (BR); Gabriel de Oliveira Ramos, Gravatai (BR); Bruno Iochins Grisci, Porto Alegre (BR); Jorge Luis Victoria Barbosa, Sao Leopoldo (BR); Cristiano Andre da Costa, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 18/110,190

(22) Filed: Feb. 15, 2023

(65) Prior Publication Data

US 2024/0275807 A1    Aug. 15, 2024

(51) Int. Cl.
*H04L 9/40* (2022.01)
*G06F 11/3604* (2025.01)

(52) U.S. Cl.
CPC ...... *H04L 63/1433* (2013.01); *H04L 63/1416* (2013.01); *H04L 63/20* (2013.01)

(58) Field of Classification Search
CPC .. H04L 63/1433; H04L 63/1416; H04L 63/20
See application file for complete search history.

(56) References Cited

U.S. PATENT DOCUMENTS 11,550,919 B2    1/2023  Dhillon et al.
2021/0264031 A1*  8/2021  Dhillon ............... G06F 21/577
(Continued)

FOREIGN PATENT DOCUMENTS

WO    WO-2023283357 A1 *  1/2023  .......... G06F 11/3604

OTHER PUBLICATIONS

Ismet Burak Kadron, Chaofan Shou, Emily O'Mahony, Yilmaz Vural, Tevfik Bultan; "Targeted Black-Box Side-Channel Mitigation for IoT"; IoT '22: Proceedings of the 12th International Conference on the Internet of Things; ACM; Nov. 2022; pp. 49-56 (Year: 2022).*

(Continued)

*Primary Examiner* — Shewaye Gelagay
*Assistant Examiner* — Courtney D Fields
(74) *Attorney, Agent, or Firm* — Ryan, Mason & Lewis, LLP

(57) ABSTRACT

Techniques are provided for multi-objective computer infrastructure vulnerability prioritization. One method comprises obtaining vulnerabilities associated with computer infrastructure elements; obtaining objectives for ranking the vulnerabilities; determining an initial population of individual solutions for addressing the vulnerabilities, wherein each individual solution comprises a ranked list of vulnerabilities; performing a multi-objective optimization that modifies the initial population of individual solutions to obtain a revised population of individual solutions, wherein each individual solution in the revised population comprises a fitness score and a ranked list of the at least some vulnerabilities; selecting an individual solution in the revised population based on the fitness score; and initiating an automated action to address one or more vulnerabilities in the selected individual solution using the ranked list of at (Continued)

least some vulnerabilities for the selected at least one individual solution.

20 Claims, 8 Drawing Sheets

(56) References Cited

U.S. PATENT DOCUMENTS

| | | | | |
|---|---|---|---|---|
| 2022/0277097 | A1* | 9/2022 | Cabot | H04W 12/02 |
| 2023/0085509 | A1* | 3/2023 | Noel | H04L 63/20 |
| | | | | 726/25 |
| 2023/0186311 | A1* | 6/2023 | Vimal | G06Q 40/02 |
| | | | | 705/44 |
| 2023/0205509 | A1* | 6/2023 | Baral | G06Q 10/06 |
| | | | | 717/172 |

OTHER PUBLICATIONS

Beck et al.; "Using Neural Networks to Aid CVSS Risk Aggregation—an Empirically Validated Approach"; Journal of Innovation in Digital Ecosystems, 3(2):148-154, 2016.

Deb et al.; A Fast and Elitist Multiobjective Genetic Algorithm: NSGA-II; IEEE Transactions on Evolutionary Computation, 6(2):182-197, 2002.

Farris et al.; "Vulcon: A System for Vulnerability Prioritization, Mitigation, and Management"; ACM Transactions on Privacy and Security (TOPS), 21(4):1-28, 2018.

Jiang et al.; "Vrank: A Context-Aware Approach to Vulnerability Scoring and Ranking in SOA"; In 2012 IEEE Sixth International Conference on Software Security and Reliability, pp. 61-70. IEEE, 2012.

Le et al.; "A Survey on Data-Driven Software Vulnerability Assessment and Prioritization"; arXiv preprint arXiv:2107.08364, 2021.

Lin, Shili; "Rank Aggregation Methods"; Wiley Interdisciplinary Reviews: Computational Statistics, 2(5):555-570, 2010.

Panichella, Annibale; "An Adaptive Evolutionary Algorithm Based on Non-Euclidean Geometry for Many-Objective Optimization"; In Proceedings of the Genetic and Evolutionary Computation Conference, pp. 595-603, 2019.

Roijers et al.; "Multi-Objective Decision Making"; Synthesis Lectures on Artificial Intelligence and Machine earning, 11(1):1-129, 2017.

Singh et al.; "Quantifying Security Risk by Critical Network Vulnerabilities Assessment"; International Journal of Computer Applications, 156(13):26-33, 2016.

Spanos et al.; "WIVSS: a New Methodology for Scoring Information Systems Vulnerabilities"; In Proceedings of the 17th Pan-Hellenic Conference on Informatics, pp. 83-90, 2013.

Tripwire. "Tripwire 2019 Vulnerability Management Survey"; 2019. URL https://www.tripwire.com/state-of-security/wp-content/uploads/sites/3/ Tripwire-Dimensional-Research-VM-Survey.pdf.

Viduto et al.; "A Novel Risk Assessment and Optimisation Model for a Multi-Objective Network Security Countermeasure Selection Problem"; Decision Support Systems, 53(3):599-610, 2012.

Wang et al.; "Ranking Attacks Based on Vulnerability Analysis"; In 2010 43rd Hawaii International Conference on System Sciences, pp. 1-10. IEEE, 2010.

Yin et al.; "Apply Transfer Learning to Cybersecurity: Predicting Exploitability of Vulnerabilities by Dscription"; Knowledge-Based Systems, 210:106529, 2020.

Colombelli et al., "Multi-Objective Prioritization for Data Center Vulnerability Remediation," 2022 IEEE Congress on Evolutionary Computation (CEC), Padua, Italy, 01-08, (2022).

"What is an Attack Vector? Understand How Hackers Exploit Attack Surfaces and the Common Types of Attack Vectors"; 2025 Cyber Threat Predictions; https://www.fortinet.com/resources/cyberglossary/attack-vector; downloaded on Aug. 18, 2025.

* cited by examiner

300

1. for $i$ in $range(|A| - 1)$ do
2.    for $j$ in $range(|A| - i - 1)$ do
3.       if $A[j] < A[j+1]$ or $B[j] < B[j+1]$ or $C[j] < C[j+1]$ or $(A[j] = A[j+1]$ and $(B[j] = B[j+1]$ and $(C[j] = C[j+1]$ then
4.          do nothing
5.       else
6.          $A[j], A[j+1] \leftarrow A[j+1], A[j]$
7.          $B[j], B[j+1] \leftarrow B[j+1], B[j]$
8.          $C[j], C[j+1] \leftarrow C[j+1], C[j]$
9.          $X[j], X[j+1] \leftarrow X[j+1], X[j]$
10.       end if
11.    end for
12. end for
13. return $X$

1. $i \leftarrow 0$
2. $num\_patches \leftarrow v$
3. for $p_i$ in $P$ do
4.     while $j < v$ do
5.         if $p_i[j] \leq target$ then
6.             if $j < num\_patches$ then
7.                 $num\_patches \leftarrow j$
8.                 $i \leftarrow$ index (position) of $p_i$ in $P$
9.             end if
10.         end if
11.         $j \leftarrow j + 1$
12.     end while
13. end for
14. return $i$

FIG. 5

MULTI-OBJECTIVE COMPUTER INFRASTRUCTURE VULNERABILITY PRIORITIZATION

FIELD

The field relates generally to information processing systems and more particularly, to the protection of computer infrastructure associated with such information processing systems.

BACKGROUND

The security of computer infrastructure of an organization, such as hardware and/or software infrastructure, must often be assessed in the face of dynamic threats. The computer infrastructure elements of the organization may often be exposed to multiple simultaneous vulnerability threats. In data center environments, for example, it is often important to address such vulnerability threats quickly to avoid data leaks and/or other security problems. A need exists for improved techniques for prioritizing the application of software patches or other vulnerability mitigation actions to improve the overall security of the organization.

SUMMARY

In one embodiment, a method comprises obtaining a plurality of vulnerabilities associated with computer infrastructure elements; obtaining a plurality of objectives for ranking the plurality of vulnerabilities; determining an initial population of individual solutions for addressing at least some of the plurality of vulnerabilities, wherein each of the individual solutions comprises a ranked list of the at least some vulnerabilities; performing a multi-objective optimization that modifies the initial population of individual solutions to obtain a revised population of individual solutions, wherein each of the individual solutions in the revised population comprises at least one fitness score and a ranked list of the at least some vulnerabilities, wherein the at least one fitness score is obtained using a fitness function; selecting at least one of the individual solutions in the revised population based at least in part on the at least one fitness score associated with the at least one individual solution; and initiating at least one automated action to address one or more of the vulnerabilities in the selected at least one individual solution using the ranked list of the at least some vulnerabilities for the selected at least one individual solution.

In some embodiments, the initial population of individual solutions comprises one or more of: (i) at least one individual solution obtained by ranking the plurality of vulnerabilities according to a given one of the plurality of objectives; (ii) at least one individual solution obtained by ranking the plurality of vulnerabilities according to a rank aggregation; and (iii) at least one individual solution obtained by randomly ranking the plurality of vulnerabilities.

In one or more embodiments, duplicate occurrences of at least one vulnerability in the plurality of vulnerabilities are merged into a single vulnerability occurrence, prior to performing the multi-objective optimization that modifies the initial population of individual solutions, and expanding the single vulnerability occurrence into the duplicate occurrences following the obtaining of the revised population of individual solutions.

In at least one embodiment, a score is assigned to at least some of the individual solutions in the revised population using a scalarization approach based at least in part on a weighting of at least some of the plurality of objectives. The weighting of at least some of the plurality of objectives may comprise a weighted sum of each of the at least some objectives, wherein the weighted sum of a given objective is based at least in part on an importance weight of the given objective. A new weighting of at least some of the plurality of objectives may be determined in response to a change in at least one importance weight associated with the plurality of objectives.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudocode for a process for performing post-optimization rank inversions in accordance with an illustrative embodiment;

FIG. 5 illustrates exemplary pseudocode for a process for performing a target-oriented search in accordance with an illustrative embodiment;

DETAILED DESCRIPTION

Figure 1:
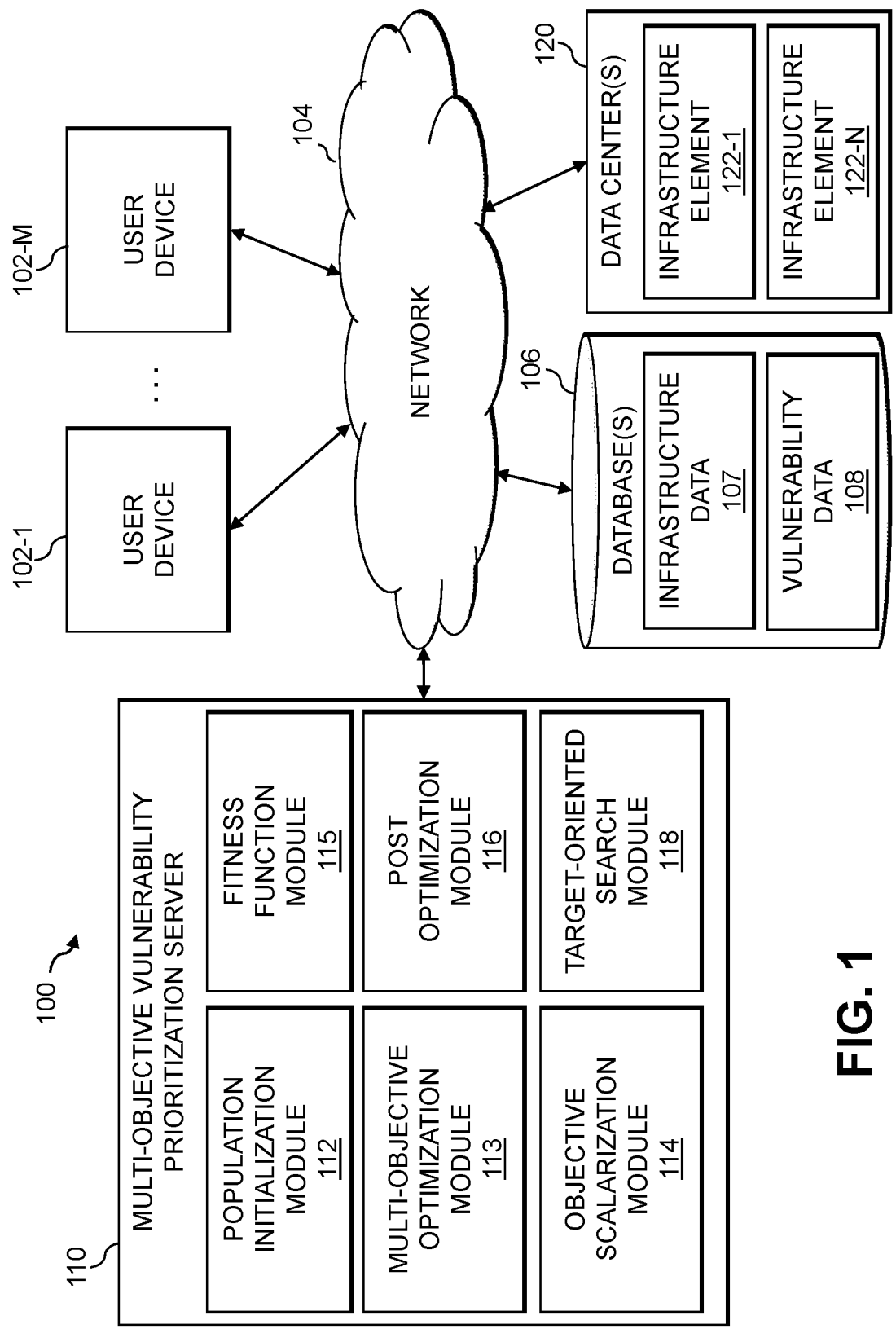
FIG. 1 illustrates an information processing system configured for multi-objective computer infrastructure vulnerability prioritization in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multi-objective computer infrastructure vulnerability prioritization.

Vulnerabilities often represent a significant concern in data centers and other computing environments of an organization. In an information security scenario, data centers, for example, often face situations where it is infeasible to quickly address multiple detected vulnerabilities. In cases where resources and/or time are scarce, having the vulnerabilities ranked by risk (or another objective) would be important to identify the vulnerabilities that should be addressed (e.g., patched) first. Thus, it is often desirable to prioritize the most hazardous vulnerabilities. In particular, it is often desirable to rank the vulnerabilities and computer infrastructure elements according to specific business and/or technical objectives in order to mitigate security and/or business operational risks.

One or more aspects of the disclosure recognize that an organization often has shifting priorities for addressing vulnerabilities. In one or more embodiments, the disclosed multi-objective vulnerability prioritization techniques allow users to designate multiple different vulnerability assessment metrics that are used to prioritize the mitigation of different vulnerabilities. The multi-objective vulnerability prioritization techniques, in some embodiments, provide a list of the vulnerabilities, based on the criteria adopted by each selected objective and the overall impact of each vulnerability in the context of an organization. In at least some embodiments, one or more individual solutions are provided that satisfy one or more specified threat reduction objectives, with the fewest number of patched vulnerabilities.

The term "computer infrastructure element" as used herein is intended to be broadly construed so as to encompass, for example, computer infrastructure components, information technology (IT) infrastructure, IT infrastructure elements, IT infrastructure components, hardware components, software components and/or other computer assets, including compute, storage, and/or networking devices, printers, virtual machines, and software applications, as well as various combinations of such entities.

Among other benefits, the disclosed techniques for multi-objective computer infrastructure vulnerability prioritization provide a prioritized list of vulnerabilities and computer infrastructure elements. The prioritized list identifies particular vulnerabilities and computer infrastructure elements that may be addressed and included in a remediation process, in order to mitigate security risks for the organization (e.g., considering that such organizations typically have multiple objectives that are modified over time).

Security teams must often rely on multiple risk assessment metrics for ranking vulnerabilities. Without well-defined automated heuristics, identifying the best solution for addressing the vulnerabilities is typically a costly and time-consuming process. In addition, the prioritization of multiple vulnerabilities can have considerable shifts depending on the one or more metrics that are employed. Thus, simple sorting algorithms applied to conflicting risk assessment metrics can disagree with the prioritization. For example, multiple objectives to employ for risk assessment may be based on, for example, a threshold with respect to a Common Vulnerability Scoring System (CVSS) score and/or a vulnerability age score metric (which relates to the date a given vulnerability was found on a computer infrastructure element).

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more databases 106, one or more multi-objective vulnerability prioritization servers 110 and one or more data centers 120. The representative data center 120 of FIG. 1 comprises one or more infrastructure elements 122-1 through 122-N, for example.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the data center 120 and/or other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The multi-objective vulnerability prioritization server 110 and the data center 120 in the FIG. 1 embodiment are assumed to be implemented using at least one processing device. Each such processing device generally comprises at least one processor and an associated memory, and implements one or more functional modules for controlling certain features of the multi-objective vulnerability prioritization server 110 and/or the data center 120.

More particularly, the multi-objective vulnerability prioritization server 110 and the data center 120 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the multi-objective vulnerability prioritization server 110, the data center 120 and/or the user devices 102 over the network 104, and each illustratively comprises one or more conventional transceivers.

In the example of FIG. 1, the multi-objective vulnerability prioritization server 110 may comprise a population initialization module 112, a multi-objective optimization module 113, an objective scalarization module 114, a fitness function module 115, a post optimization module 116 and a target-oriented search module 118. Generally, the population initialization module 112 may generate an initial population of individual solutions for addressing vulnerabilities of an organization. The individual solutions may each comprise a ranked list of the vulnerabilities. The multi-objective optimization module 113 performs a multi-objective optimization on the initial population of individual solutions to obtain a revised population of individual solutions. The individual solutions in the revised population comprises one or more fitness scores (e.g., obtained by the fitness function module 115 using a fitness function) and a ranked list of the vulnerabilities.

The objective scalarization module 114 assigns a score to the individual solutions in the revised population using a scalarization approach based on a weighting of the objectives employed by the multi-objective optimization module 113. The post optimization module 116 performs a post-optimization inversion of the ranks of two or more vulnerabilities in the individual solutions in the revised population and corrects inverted rankings of the two or more vulnerabilities. The target-oriented search module 118 performs a target-based search to identify the vulnerabilities in the individual solutions in the revised population that may be addressed to satisfy a specified target value, as discussed further below.

It is to be appreciated that the particular arrangement of elements 112 through 118 illustrated in the representative multi-objective vulnerability prioritization server 110 of the FIG. 1 embodiment is presented by way of example only, and alternative arrangements can be used in other embodiments. For example, the functionality associated with the elements 112 through 118 in other embodiments can be combined into a single element, or separated across a larger number of elements. As another example, multiple distinct processors can be used to implement different ones of the elements 112 through 118, or portions thereof.

At least portions of elements 112 through 118 may be implemented at least in part in the form of software that is stored in memory and executed by a processor.

The multi-objective vulnerability prioritization server 110 and/or the data center 120 can have at least one associated database 106 configured to store (i) infrastructure data 107 pertaining to, for example, configuration data, product identifiers and/or analytic data associated with one or more computer infrastructure elements and (ii) vulnerability data 108 pertaining to, for example, known vulnerabilities associated with one or more of the computer infrastructure elements. In at least some embodiments, the computer infrastructure elements optionally can correspond to one or more infrastructure elements 122-1 through 122-N associated with one or more data centers 120, for example.

The database 106 can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

It is to be understood that the particular set of elements shown in FIG. 1 for multi-objective computer infrastructure vulnerability prioritization is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the data centers 120 and at least one associated database can be on and/or part of the same processing platform.

An exemplary process utilizing elements 112 through 118 of the multi-objective vulnerability prioritization server 110 and elements 122 of the data center 120 in computer network 100 will be described in more detail with reference to, for example, FIGS. 2 and 6.

The vulnerability remediation lifecycle typically starts by scanning the computer infrastructure element to detect vulnerabilities. Thereafter, a security team can classify the detected vulnerabilities using predefined metrics (e.g., a vulnerability risk score that considers the vulnerability severity and exploitability; vulnerability age that provides a measure of the time elapsed since the discovery of the vulnerability in a data center; and importance of the particular computer infrastructure element that measures how critical, confidential, or relevant the data, application, or other computer infrastructure element impacted by the vulnerability is for the organization) and company guidelines to categorize the severity level of each vulnerability. A risk score or another metric is then given to each vulnerability, enabling their prioritization and ranking and allowing the security team to select which individual solution (e.g., set of vulnerabilities ranked by specific metrics) should be patched first.

One or more aspects of the present disclosure recognize that multi-objective optimization is a promising strategy that can consider the vulnerability assessment and the different predefined metrics (where each metric is represented as an objective to be optimized simultaneously). There is often no single solution in multi-objective problems capable of optimizing all objectives. Thus, there may be several optimal solutions, in the sense that no other solution is better than the set of optimal solutions considering all the objectives. For these solutions, it is impossible to improve one of the objectives without worsening one or more other objectives.

In some embodiments, multiple metrics offering orthogonal information about the risk, are considered simultaneously and individually. By considering each metric associated with risk as an objective to be optimized, multi-objective algorithms can find a set of risk prioritization ranks, and the users can choose a solution that satisfies their current needs. This decision can account for distinct needs for each user and be effectively updated.

In one or more embodiments, the disclosed multi-objective vulnerability prioritization method aims to provide prioritization rank lists with solutions containing the vulnerabilities that should be addressed (e.g., patched) depending on user preferences. Thus, one possible solution for this problem is a list of rankings (e.g., positions in the rank of vulnerabilities), where the ones with the lowest rankings are at the top of the rank and should be patched first. In this manner, the optimization process ranks each vulnerability, focusing on better contemplating the concerns of one or more users regarding the patching urgency of each vulnerability, as measured by the adopted metrics (e.g., a CVSS score, a number of affected services, and others).

In addition, the generated solutions can assign the same ranking for more than one vulnerability, which means these vulnerabilities are tied and have the same priority. During the optimization process, ties are represented in some embodiments as the minimum ranking value that would have been assigned to all of the tied values (sometimes referred to as competition ranking). One example of this behavior is a rank with three vulnerabilities $\{V_1, V_2, V_3\}$. If the vulnerability $V_1$ is tied with vulnerability $V_3$ and has a higher priority than vulnerability $V_2$, the solution rank would look like [1, 3, 1]. Thus, this means that vulnerability $V_1$ and vulnerability $V_3$ have the same priority ranking of 1 and that the third position is occupied by vulnerability $V_2$. With competition ranking, the vulnerabilities with the same score do not have an arbitrary order; instead, they are tied.

Figure 2:
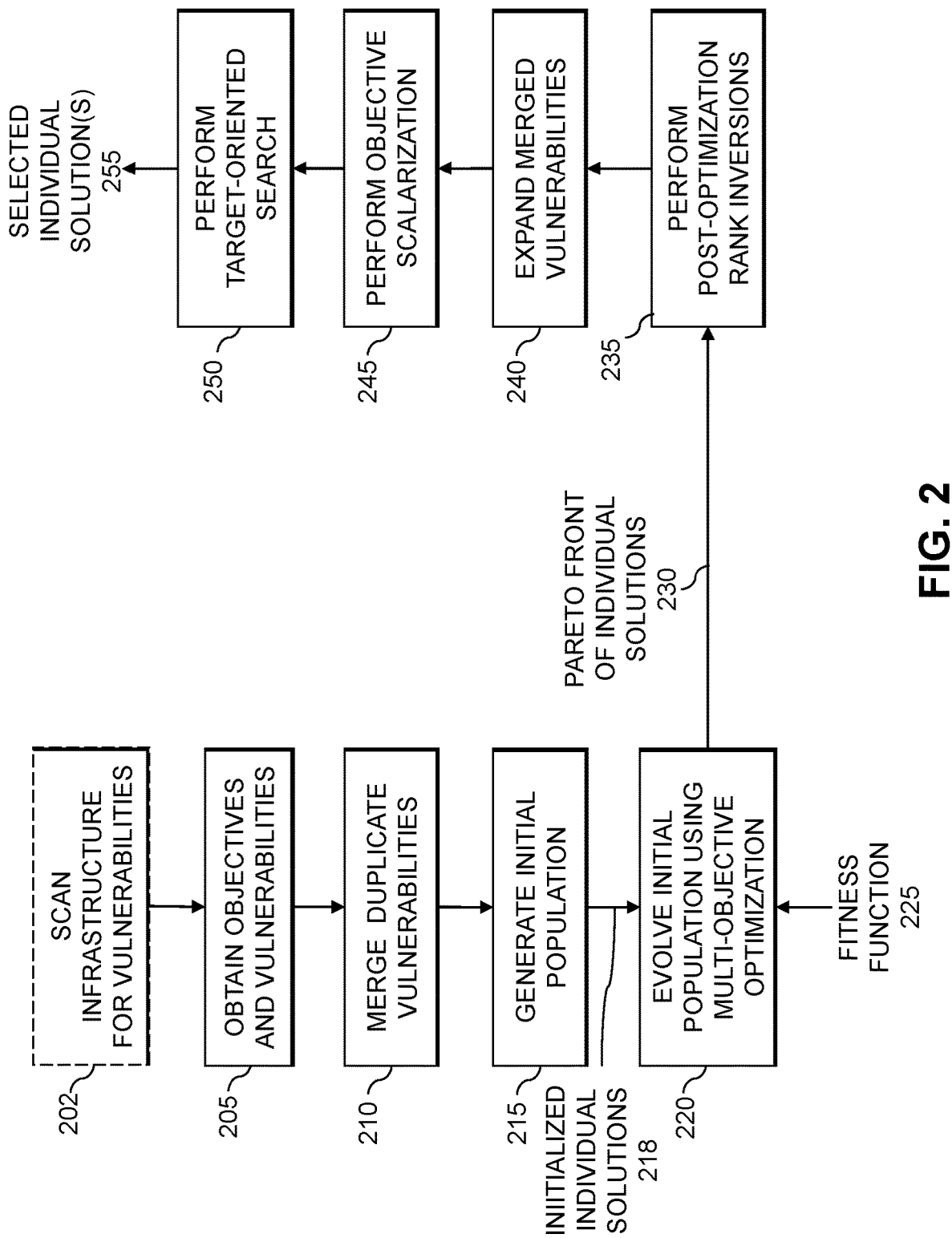
FIG. 2 is a flow diagram illustrating an exemplary process for multi-objective computer infrastructure vulnerability prioritization in accordance with an illustrative embodiment.

FIG. 2 is a flow diagram illustrating an exemplary process for multi-objective computer infrastructure vulnerability prioritization in accordance with an illustrative embodiment. In the example of FIG. 2, the computer infrastructure of an organization is scanned for vulnerabilities (e.g., using a commercially available scanning tool or scanning software) in step 202. In step 205, the process obtains the multiple objectives and vulnerabilities. In this manner, organizations can designate the most relevant metrics for the vulnerability evaluation, to allow users to make well-informed decisions regarding which computer infrastructure element and vulnerability should receive attention first. The distinct vulnerability assessment metrics are treated as objectives in the multi-objective method, allowing the combination and customization of the importance of each metric. The metrics, in at least some embodiments, are numeric or converted to a numeric format to order the vulnerabilities according to a particular metric.

In step 210, the process merges duplicate occurrences of the same vulnerability into a single occurrence for processing by the multi-objective prioritization process. These duplicate occurrences of the same vulnerability are reintroduced in the priority rank later in the optimization process, receiving the same ranking as the ones that had the same objective values and were considered in the optimization. In some embodiments, the duplicate occurrences of vulnerabilities may comprise different vulnerabilities having the same value for the various considered objectives, or values that otherwise satisfy one or more duplicate occurrence criteria for the various objectives.

In step 215, an initial population is generated comprising a set of initialized individual solutions 218. Individual objectives are used in some embodiments to create an initial population for the multi-objective optimization process to acquire the best solutions faster. One initial population is generated comprising multiple individual solutions obtained using one or more of three representative techniques, discussed hereinafter. Each individual solution comprises a vector with ranked entries for each vulnerability (where, for example, a vulnerability with rank 1 is patched first). Generally, the multi-objective optimization optimizes multiple objectives and the initialization process separately uses the same multiples objectives.

The initial population is based on one or more of: (i) the best individual vulnerabilities according to each isolated objective; (ii) individual vulnerabilities generated by a rank aggregation method using a Borda count method over the best ranks according to each objective (e.g., vulnerability risk, vulnerability age and importance of the computer infrastructure element); and (iii) random individual solutions (e.g., give all vulnerabilities a random ranking for each individual solution) to explore a broader area of a Pareto front, discussed further below, and diversify the final set of non-dominated solutions.

The rank aggregation individuals are obtained by applying a Borda count method over the best ranks according to each objective, using different weights for each rank. The Borda count method gives a weight to each rank and performs a weighted sum for each vulnerability ranking, adding up their positions in each rank, multiplied by their respective rank weights. See, for example, Shili Lin, "Rank Aggregation Methods," Wiley Interdisciplinary Reviews: Computational Statistics, 2(5):555-570, (2010), incorporated by reference herein in its entirety.

The random individuals may be obtained by randomly choosing a ranking for each position in the solution vector (e.g., for each vulnerability). The rankings are lower bounded by the top position of the solution rank and upper bounded by the last possible position in this rank. Additionally, as explained above, ties are allowed. Thus, the ranking sampling for each position in the solution vector is performed with replacement, which means the same random ranking could be assigned for more than one vulnerability.

In step 220, the set of initialized individual solutions 218 and a fitness function 225 are applied to a multi-objective optimization process (or another evolutionary algorithm) to evolve the initial population and generate a Pareto front of individual solutions 230. Each individual solution in the Pareto front of individual solutions 230 comprises a vector having a ranked position for each vulnerability. The fitness function 225, in at least some embodiments, is expressive when assessing the quality of each individual solution and is computationally efficient.

The multi-objective optimization process may be implemented using, for example, a non-dominated sorting genetic algorithm (NSGA-II) and/or an adaptive geometry estimation-based multi-objective evolutionary algorithm (AGE-MOEA), each further described in, respectively, Deb Kalyanmoy et al., "A Fast and Elitist Multiobjective Genetic Algorithm: NSGA-II," IEEE Trans. on Evolutionary Computation, 6(2): 182-197 (2002) and Annibale Panichella, "An Adaptive Evolutionary Algorithm based on Non-Euclidean Geometry for Many-Objective Optimization," Proc. of the Genetic and Evolutionary Computation Conference, 595-603 (2019), each incorporated by reference herein in their entirety.

In at least some embodiments, NSGA-II is a genetic algorithm with special mating and survival selection that is used in many multi-objective optimization challenges. In the NSGA-II algorithm, the individuals are selected front-wise, and then the front is split based on a crowding distance (the Manhattan Distance in the objective space) between solutions. AGE-MOEA is an adaptive evolutionary algorithm based on non-Euclidean geometry for many objective optimizations. AGE-MOEA estimates the geometry of the generated front and adapts the diversity and proximity metrics accordingly. The main characteristic of the AGE-MOEA is that the non-dominated fronts are sorted using a non-dominated sorting procedure, then the first front obtained is used for normalization of the objective space and estimation of Pareto front geometry. One characteristic of AGE-MOEA is that it estimates the p parameter of a Minkowski p-norm to compute a survival score that combines distance from the neighbors and proximity to the ideal point. The algorithm also uses a binary tournament mating selection to increase selection pressure. The first evaluation compares each individual solution using the rank and then a second evaluation compares the computed score representing proximity and spread.

The fitness function 225 is employed by the multi-objective optimization of step 220 to assess the quality of an individual solution. Since the problem is a multi-objective optimization, the fitness function 225 describes separately how good the solution is for each objective. The best possible solution for a single objective is a rank ordered by its defined metric. Additionally, the rank built from sorting a single objective results in too many ties. This rank has its ties broken by using the other objectives sorted by their metrics, resulting in multiple best ranks for each objective depending on the priority of each metric.

To better understand this functionality, consider the metrics $\{M_1, M_2, M_3\}$ represented by the objectives $\{O_1, O_2, O_3\}$ respectively. The two best ranks for objective $O_1$ are: (i) the rank ordered by metric $M_1$, ties broken by metric $M_2$ and then ties broken by metric $M_3$; and (ii) the rank ordered by metric $M_1$, ties broken by metric $M_3$ and then ties broken by metric $M_2$. For example, in the case of rank (i), the first tie-breaking is employed because a number of vulnerabilities could have the same value of metric $M_1$, and the second tie-breaking is used because several could have the same metric $M_1$ value and metric $M_2$ value.

After computing the two best possible ranks for each objective (in the case with three objectives), it is possible to evaluate the quality of any feasible solution. The evaluation process must compute how close the solution is to each objective's two best possible ranks and return the smallest distance. This rank distance is calculated by the Kendall Tau rank correlation equation, which results in a number within the $[-1, 1]$ range. See, for example, Maurice G Kendall, "The Treatment of Ties in Ranking Problems," Biometrika, 33(3):239-251, (1945), incorporated by reference herein in its entirety. The more correlated the two ranks are, the greater their Kendall Tau value and, consequently, the closer the ranks (meaning that they agree more).

A Kendall Tau value of 1, in at least some embodiments, depicts a total agreement between ranks, and a value of $-1$ represents total disagreement. The Kendall Tau value can be defined by K $(\tau_1, \tau_2)$, as shown below, where $\tau_1(i)$ and $\tau_2(i)$ are the rankings of element i in the lists $\tau_1$ and $\tau_2$, and P is the set of unsorted pairs of distinct elements in $\tau_1$ and $\tau_2$:

$$K(\tau_1, \tau_2) = \sum_{\{i,j\} \in P} \overline{K}_{i,j}(\tau_1, \tau_2) \overline{K}_{i,j}(\tau_1, \tau_2),$$

where:

$$\overline{K}_{i,j}(\tau_1, \tau_2) = \begin{cases} 0 & \text{if } i \text{ and } j \text{ are in the same order in } \tau_1 \text{ and } \tau_2 \\ 1 & \text{if } i \text{ and } j \text{ are in the reverse order in } \tau_1 \text{ and } \tau_2 \end{cases}.$$

The Kendall Tau concept is mapped to the notion of distance between two ranks by multiplying the resulting correlation by $-1$, and, thus, the objective becomes minimizing this distance, in at least some embodiments, the same as maximizing the correlation. In the example with three objectives, the final three values composing the fitness vector correspond to the solution's rank distance to the three objectives being optimized. Each fitness value is calculated by taking the minimum distance between the solution rank and the two best possible ranks for a particular objective.

The Pareto front of individual solutions 230 generated by step 220 is processed in step 235 to perform a post-optimization rank inversion process to fine-tune the individual solutions by correcting out-of-order elements in the solutions, as discussed further below in conjunction with FIG. 3.

The duplicate vulnerabilities that were merged in step 210 are then expanded in step 240.

An objective scalarization is performed in step 245, for example, using user-defined preferences, such as importance weights between 0.0 and 1.0 for each objective. The importance weights reflect the importance that the user ascribes to each objective, in which 1.0 means that the objective is very significant and 0.0 means that it is irrelevant, for example. The objective scalarization of step 245, in some embodiments, computes a weighted sum of the fitness of an objective multiplied by their importance weights to obtain a single optimality value representing the quality of a solution given the user preferences. This step can be recomputed each time the user changes a weight.

The post-optimization scalarization process of step 245 (sometimes referred to as a posteriori scalarization) is used, for example, in decision support scenarios where it may be undesirable, infeasible, or even impossible to adopt a single scalar value for describing the quality of a particular solution during an optimization phase. For instance, consider a complex and dynamic environment where there could be thousands or even millions of vulnerabilities in a particular set of computer infrastructure. In this case, it may not be possible to re-execute a single-objective optimization process with a priori scalarization whenever there is a change in the preferences over the optimized metrics. Additionally, in the disclosed multi-objective a posteriori scalarization approach, the user can more easily investigate the outcomes that a different set of weights (e.g., preferences) may provide, which further justifies its usage instead of the single-objective optimization approach.

A target-oriented search is performed in step 250, as discussed further below in conjunction with FIGS. 4 and 5, using patching impacts and target metrics. The target-oriented search produces one or more selected individual solutions 255. A Vulnerabilities to Reach the Reduction Targets (VRRT) metric may be employed to consider the objectives of an organization and to count how many vulnerabilities would have to be addressed to reach a certain reduction on the mean value of a specific metric. The interest with the VRRT metric is to calculate how many vulnerabilities would have to be addressed (according to a specific prioritization order from a given individual solution rank) to reach specified targets. Some embodiments aim to patch the fewest number of vulnerabilities, aiming to save resources and more efficiently reduce the risk of a given computer infrastructure element.

In at least some embodiments, if the user-defined preferences change over time, only the scalarization of step 245 and the target-oriented search of step 250 are re-executed.

For a more detailed discussion of processes for multi-objective computer infrastructure vulnerability prioritization in accordance with the disclosed techniques, see, for example, F. Colombelli et al., "Multi-Objective Prioritization for Data Center Vulnerability Remediation," 2022 IEEE Congress on Evolutionary Computation (CEC), Padua, Italy, 01-08, (2022), doi: 10.1109/CEC55065.2022.9870289, incorporated by reference herein in its entirety.

FIG. 3 illustrates exemplary pseudocode for a process 300 for performing post-optimization rank inversions in accordance with an illustrative embodiment. One or more aspects of the disclosure recognize that slight changes can improve the solutions generated from the multi-objective optimization of FIG. 2. One option is to apply slight perturbations to the solutions to obtain better results. In this case, because the solutions are ranks of vulnerabilities, a sorting algorithm that searches for inversions in the rank and fixes them can be used. An inversion occurs when a vulnerability A is placed in the rank after vulnerability B, but considering the metrics being optimized, vulnerability A is better in at least one objective while also being better or equal to vulnerability B in all the remaining objectives. If this happens, the described sorting procedure changes the rank order to put vulnerability A in front of vulnerability B.

In one or more embodiments, the inversion search procedure can be implemented based on a bubble sort algorithm due to the lack of the transitivity property in the rank order of the objective tuples, preventing the usage of more efficient sorting algorithms.

Consider a scenario where there are objectives being optimized in which there are three elements A, B and (with the metrics values of [2, 2, 1, 0], [3, 1, 1, 0] and [2, 2, 0, 0], respectively. Suppose a solution established the order {A, B, C}. In this case, the elements {A, B} and {B, C} do not have a precise order, so they must keep this ordering, but the element (should come before A. A classic sorting algorithm, such as quick sort or merge sort, with complexity of O(n log n), could compare A with B, conclude that they are ordered (so A<B), compare A with C and conclude that C<A, so it is clear that C<B, and, thus, the final order would be {C, A, B}, which would violate the solution's established order of B<C. The bubble sort algorithm does not have this problem since it always compares two elements next to each other, performing a swap between them if necessary.

In the example of FIG. 3, the inputs to the process 300 comprise A, B, C, X and the output is a possibly revised version of X. In addition, A is a vector with the values for objective A;
B is a vector with the values for objective B;
C is a vector with the values for objective C;
X is a vector with the indices of each vulnerability;
|A| is the length of the vector A; and
range(n) is a function that returns all naturals between 0 and n, n excluded.

The representative process 300 of FIG. 3 employs an adapted bubble sorting routine for comparing the three objectives being optimized to search for, and correct, inversions in the ranking.

Figure 4:
FIG. 4 illustrates exemplary pseudocode for a process for computing patching impacts in accordance with an illustrative embodiment.

FIG. 4 illustrates exemplary pseudocode for a process 400 for computing patching impacts in accordance with an illustrative embodiment. In some embodiments, the patching impacts of the vulnerabilities are precomputed for multiple solutions.

In the example of FIG. 4, the inputs to the patching impact computation process 400 comprise S and m, and the output is a list of patching impact vectors, P, for a given solution. In addition, S is a list of solutions in the Pareto front;
$s_i$ is a solution in S;
P is the list of patching impacts vectors;
$p_i$ is the patching impact vector associated with solution $s_i$;
v is the number of vulnerabilities ($v=|s_i|=|p_i|$);
m is the metric used for performing the target search (e.g., risk score and/or vulnerability age);
mean(me, $s_i$) is a function that computes the mean value of me for the vulnerabilities in $s_i$; and
sort($s_i$) is a function that sorts the vulnerabilities in $s_i$ according to their position in the rank represented by solution $s_i$.

FIG. 5 illustrates exemplary pseudocode for a process 500 for performing a target-oriented search in accordance with an illustrative embodiment. A practical evaluation of a solution considers the target-oriented search, which measures how many vulnerabilities, following the rank order, are needed to reach a specified target value. This value represents the specific score goal that an organization desires to attain for the considered environments. For instance, the initial mean vulnerability risk of a given system can have a severity score that varies between 0 and 1000 (where higher values indicate a higher vulnerability severity), so as an example, the organization could have a vulnerability mean risk score of around 600. If the organization wishes to lower this mean risk score value to 400 (in this case, this value represents the target value for a chosen particular metric), then some vulnerabilities need to be patched. The target-oriented search verifies each solution in the Pareto front, in search for the solution that reaches the specified targets in the fewest possible vulnerability patches. In order to make this process computationally efficient, the resulting patching impacts of every vulnerability patch are precomputed for the solutions by the process 400 of FIG. 4. This computation removes the vulnerabilities while recalculating new means for the considered metrics.

Different metrics (e.g., besides the vulnerability risk) can be considered in some embodiments of the multi-objective scenario, so the goal may be to simultaneously minimize all targets corresponding to other objectives. Through these entity-defined targets and a set of considered solutions, this step computes, for each solution, how many vulnerabilities must be patched to achieve the chosen targets. The so-called best solution, in some embodiments, is the one that achieves the target in the least number of patches possible. Thus, the target-oriented search provides extra functionality after the optimization process that complements the user's preferences scalarization of step 245, tailoring their needs to actual reportable patching impact results.

A user-defined parameter, referred to as the number of solutions, is defined to couple the objectives scalarization of step 245 with the target-oriented search of step 250 to assist in this process. The number of solutions specifies how many solutions are to be considered in the target-oriented search after applying the objectives scalarization. Therefore, if the number of solutions parameters is set to 10, the top 10 solutions (e.g., in terms of optimality) are selected for the target-oriented search procedure.

In the example of FIG. 5, the inputs to the target-oriented search process 500 comprise the list of patching impacts vectors, P, from the process 400 of FIG. 4, and a target value. The output of the process 500 is an index, i, of the best solution in the list, S, of solutions in the Pareto front. The representative process 500 for performing a target-oriented search considers one metric, m, to perform the target-oriented search.

Figure 6:
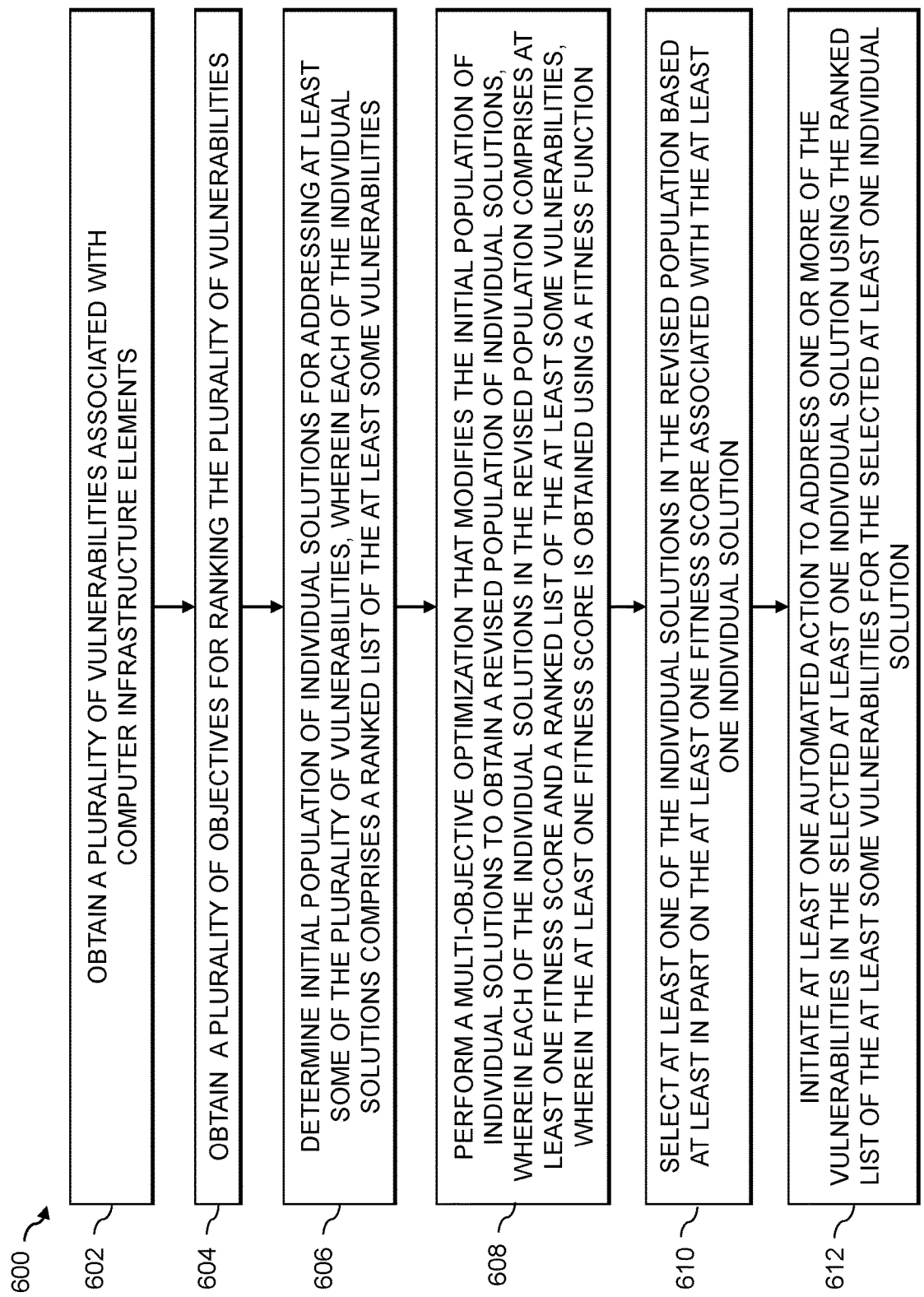
FIG. 6 is a flow diagram illustrating an exemplary process for multi-objective computer infrastructure vulnerability prioritization in accordance with an illustrative embodiment.

FIG. 6 is a flow diagram illustrating an exemplary process 600 for multi-objective computer infrastructure vulnerability prioritization in accordance with an illustrative embodiment. In the example of FIG. 6, the process 600 initially obtains a plurality of vulnerabilities associated with computer infrastructure elements in step 602. In step 604, the process 600 obtains a plurality of objectives for ranking the plurality of vulnerabilities. An initial population of individual solutions for addressing at least some of the plurality of vulnerabilities is determined in step 606, wherein each of the individual solutions comprises a ranked list of the at least some vulnerabilities.

In step 608, a multi-objective optimization is performed that modifies the initial population of individual solutions to obtain a revised population of individual solutions, wherein each of the individual solutions in the revised population comprises at least one fitness score and a ranked list of the at least some vulnerabilities, wherein the at least one fitness score is obtained using a fitness function.

In step 610, the process 600 selects at least one of the individual solutions in the revised population based at least in part on the at least one fitness score associated with the at least one individual solution. At least one automated action is initiated in step 612 to address one or more of the vulnerabilities in the selected at least one individual solution using the ranked list of the at least some vulnerabilities for the selected at least one individual solution.

In at least one embodiment, the plurality of objectives is defined by one or more users. The initial population of individual solutions may comprise one or more of: (i) at least one individual solution obtained by ranking the plurality of vulnerabilities according to a given one of the plurality of objectives; (ii) at least one individual solution obtained by ranking the plurality of vulnerabilities according to a rank aggregation; and (iii) at least one individual solution obtained by randomly ranking the plurality of vulnerabilities. Each of the individual solutions may comprise a vector having a position for each of the ranked vulnerabilities.

In one or more embodiments, duplicate occurrences of at least one vulnerability in the plurality of vulnerabilities are merged into a single vulnerability occurrence, prior to performing the multi-objective optimization that modifies the initial population of individual solutions, and expanding the single vulnerability occurrence into the duplicate occurrences following the obtaining of the revised population of individual solutions.

In some embodiments, at least one inversion is identified of a ranking of two or more vulnerabilities in at least one of the individual solutions in the revised population and correcting the at least one inversion of the ranking of the two or more vulnerabilities. A target-based search may be performed to identify the one or more vulnerabilities in at least one of the individual solutions in the revised population to address in order to satisfy a target value.

In at least one embodiment, a score is assigned to at least some of the individual solutions in the revised population using a scalarization approach based at least in part on a weighting of at least some of the plurality of objectives. The weighting of at least some of the plurality of objectives may comprise a weighted sum of each of the at least some objectives, wherein the weighted sum of a given objective is based at least in part on an importance weight of the given objective. A new weighting of at least some of the plurality of objectives may be determined in response to a change in at least one importance weight associated with the plurality of objectives.

In one or more embodiments, the multi-objective optimization module employs one or more of a non-dominated sorting genetic algorithm and an adaptive geometry estimation-based multi-objective evolutionary algorithm.

The particular processing operations and other network functionality described in conjunction with the pseudocode and/or flow diagrams of FIGS. 2 through 6 are presented by way of illustrative example only and should not be construed as limiting the scope of the disclosure in any way. Alternative embodiments can use other types of processing operations for multi-objective computer infrastructure vulnerability prioritization. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for multi-objective computer infrastructure vulnerability prioritization provide a prioritized list of vulnerabilities and computer infrastructure elements. The prioritized list identifies particular vulnerabilities and computer infrastructure elements that may be addressed and included in a remediation process, in order to mitigate security risks for an organization.

One or more embodiments of the disclosure provide improved methods, apparatus and computer program products for multi-objective computer infrastructure vulnerability prioritization. The disclosed multi-objective vulnerability prioritization techniques significantly reduce a number of communications that do not have a correct item identifier. In addition, by limiting the approximate string matching to item identifiers that have previously been associated with the same user (e.g., using a user identifier), the search space is significantly reduced (thereby reducing the computational complexity of the disclosed similarity evaluation approach).

The foregoing applications and associated embodiments should be considered as illustrative only, and numerous other embodiments can be configured using the techniques disclosed herein, in a wide variety of different applications.

It should also be understood that the disclosed techniques for multi-objective vulnerability prioritization, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-objective computer infrastructure vulnerability prioritization may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform as a service (PaaS) model, an Infrastructure as a service (IaaS) model, a Storage-as-a-Service (STaaS) model and/or a Function-as-a-Service (FaaS) model, although numerous alternative arrangements are possible. Also, illustrative embodiments can be implemented outside of the cloud infrastructure context, as in the case of a stand-alone computing and storage system implemented within a given enterprise.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-objective vulnerability prioritization engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-objective vulnerability prioritization platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
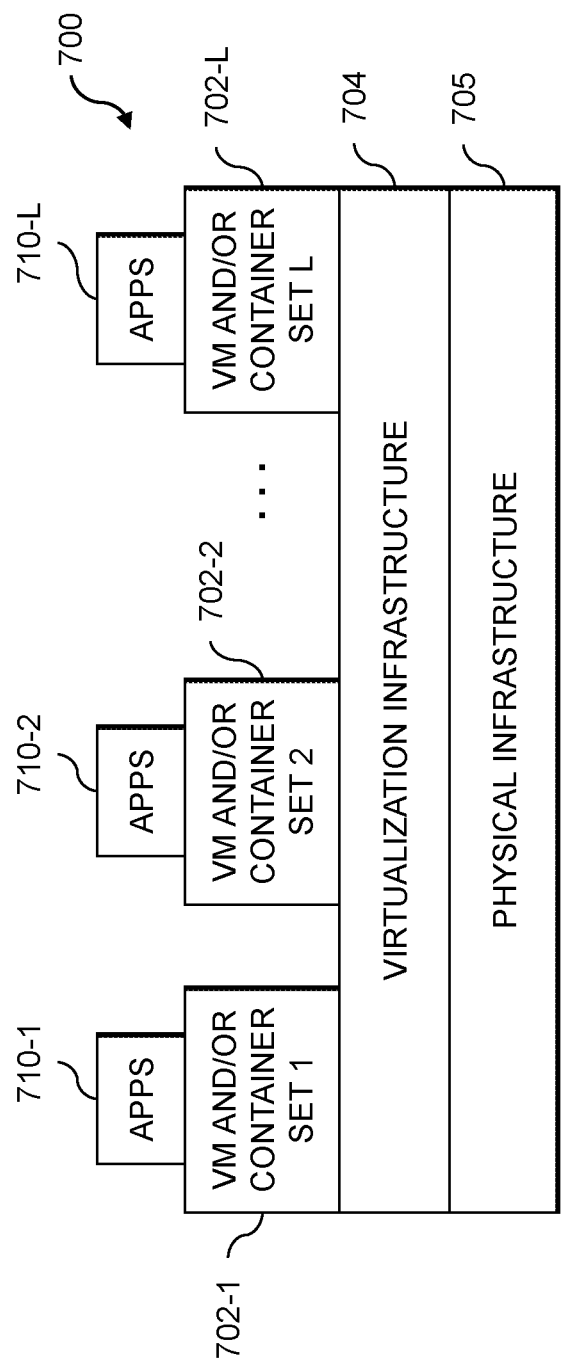
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide multi-objective vulnerability prioritization functionality of the type described above for one or more processes running on a given one of the VMs. For example, each of the VMs can implement multi-objective vulnerability prioritization control logic and associated functionality for mitigating vulnerabilities using the determined prioritization.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide multi-objective vulnerability prioritization functionality of the type described above for one or more processes running on different ones of the containers. For example, a container host device supporting multiple containers of one or more container sets can implement one or more instances of multi-objective vulnerability prioritization control logic and associated functionality for mitigating vulnerabilities using the determined prioritization.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
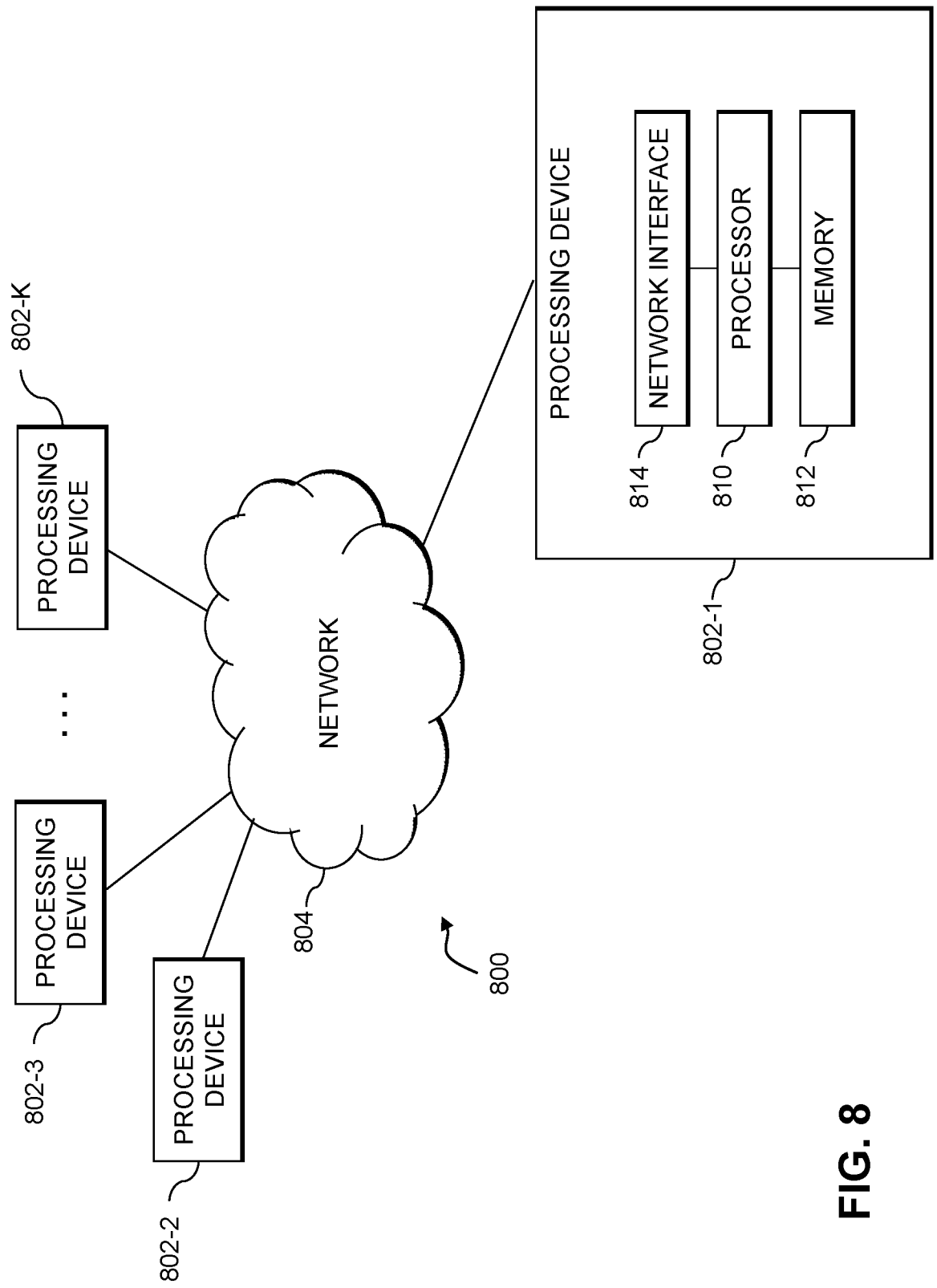
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of vulnerabilities associated with computer infrastructure elements;
obtaining a plurality of objectives for ranking the plurality of vulnerabilities;
determining an initial population of individual solutions for addressing at least some of the plurality of vulnerabilities;
performing a multi-objective optimization that modifies the initial population of individual solutions for addressing at least some of the plurality of vulnerabilities to obtain a revised population comprising a Pareto front of individual solutions for addressing at least some of the plurality of vulnerabilities, wherein each of the individual solutions in the revised population comprises: (i) a vector having a ranked position for each of the at least some of the plurality of vulnerabilities, (ii) one or more mitigation actions to address one or more of the plurality of vulnerabilities, and (iii) at least one fitness score, obtained using a fitness function, that characterizes a quality of the respective individual solution for at least some of the plurality of objectives, wherein one or more of the at least some of the plurality of vulnerabilities are mitigated in an order based at least in part on the ranked position for the respective individual solution;
selecting at least one of the individual solutions in the revised population based at least in part on the at least one fitness score associated with the at least one individual solution; and
initiating at least one mitigation action to address one or more of the plurality of vulnerabilities in the selected at least one individual solution using the ranked position of the at least some of the plurality of vulnerabilities for the selected at least one individual solution;
wherein the method is performed by at least one processing device comprising a processor coupled to a memory.

2. The method of claim 1, wherein the plurality of objectives is defined by one or more users.

3. The method of claim 1, wherein the initial population of individual solutions comprises one or more of: (i) at least one individual solution obtained by ranking the plurality of vulnerabilities according to a given one of the plurality of objectives; (ii) at least one individual solution obtained by ranking the plurality of vulnerabilities according to a rank aggregation; and (iii) at least one individual solution obtained by randomly ranking the plurality of vulnerabilities.

4. The method of claim 1, further comprising merging duplicate occurrences of at least one vulnerability in the plurality of vulnerabilities into a single vulnerability occurrence prior to performing the multi-objective optimization to modify the initial population of individual solutions and expanding the single vulnerability occurrence into the duplicate occurrences following the obtaining of the revised population of individual solutions.

5. The method of claim 1, further comprising identifying at least one inversion of a ranking of two or more vulnerabilities in at least one of the individual solutions in the revised population and correcting the at least one inversion of the ranking of the two or more vulnerabilities.

6. The method of claim 1, further comprising performing a target-based search to identify the plurality of vulnerabilities in at least one of the individual solutions in the revised population to address in order to satisfy a target value.

7. The method of claim 1, further comprising assigning a score to at least some of the individual solutions in the revised population using a scalarization approach based at least in part on a weighting of at least some of the plurality of objectives.

8. The method of claim 7, wherein the weighting of at least some of the plurality of objectives comprises a weighted sum of each of the at least some of the plurality of objectives, wherein the weighted sum of a given objective is based at least in part on an importance weight of the given objective.

9. The method of claim 8, wherein a new weighting of at least some of the plurality of objectives is determined in response to a change in at least one importance weight associated with the plurality of objectives.

10. The method of claim 1, wherein the multi-objective optimization employs one or more of a non-dominated sorting genetic algorithm and an adaptive geometry estimation-based multi-objective evolutionary algorithm.

11. An apparatus comprising:
at least one processing device comprising a processor coupled to a memory;
the at least one processing device being configured to implement the following steps:
obtaining a plurality of vulnerabilities associated with computer infrastructure elements;
obtaining a plurality of objectives for ranking the plurality of vulnerabilities;
determining an initial population of individual solutions for addressing at least some of the plurality of vulnerabilities;
performing a multi-objective optimization that modifies the initial population of individual solutions for addressing at least some of the plurality of vulnerabilities to obtain a revised population comprising a Pareto front of individual solutions for addressing at least some of the plurality of vulnerabilities, wherein each of the individual solutions in the revised population comprises: (i) a vector having a ranked position for each of the at least some of the plurality of vulnerabilities, (ii) one or more mitigation actions to address one or more of the plurality of vulnerabilities, and (iii) at least one fitness score, obtained using a fitness function, that characterizes a quality of the respective individual solution for at least some of the plurality of objectives, wherein one or more of the at least some of the plurality of vulnerabilities are mitigated in an order based at least in part on the ranked position for the respective individual solution;
selecting at least one of the individual solutions in the revised population based at least in part on the at least one fitness score associated with the at least one individual solution; and
initiating at least one mitigation action to address one or more of the plurality of vulnerabilities in the selected at least one individual solution using the ranked position of the at least some of the plurality of vulnerabilities for the selected at least one individual solution.

12. The apparatus of claim 11, further comprising merging duplicate occurrences of at least one vulnerability in the plurality of vulnerabilities into a single vulnerability occurrence prior to performing the multi-objective optimization to modify the initial population of individual solutions and expanding the single vulnerability occurrence into the duplicate occurrences following the obtaining of the revised population of individual solutions.

13. The apparatus of claim 11, further comprising identifying at least one inversion of a ranking of two or more vulnerabilities in at least one of the individual solutions in the revised population and correcting the at least one inversion of the ranking of the two or more vulnerabilities.

14. The apparatus of claim 11, further comprising performing a target-based search to identify the plurality of vulnerabilities in at least one of the individual solutions in the revised population to address in order to satisfy a target value.

15. The apparatus of claim 11, further comprising assigning a score to at least some of the individual solutions in the revised population using a scalarization approach based at least in part on a weighting of at least some of the plurality of objectives, wherein the weighting of at least some of the plurality of objectives comprises a weighted sum of each of the at least some of the plurality of objectives, wherein the weighted sum of a given objective is based at least in part on an importance weight of the given objective, and wherein a new weighting of at least some of the plurality of objectives is determined in response to a change in at least one importance weight associated with the plurality of objectives.

16. The apparatus of claim 11, wherein the initial population of individual solutions comprises one or more of: (i) at least one individual solution obtained by ranking the plurality of vulnerabilities according to a given one of the plurality of objectives; (ii) at least one individual solution obtained by ranking the plurality of vulnerabilities according to a rank aggregation; and (iii) at least one individual solution obtained by randomly ranking the plurality of vulnerabilities.

17. A non-transitory processor-readable storage medium having stored therein program code of one or more software programs, wherein the program code when executed by at least one processing device causes the at least one processing device to perform the following steps:
obtaining a plurality of vulnerabilities associated with computer infrastructure elements;
obtaining a plurality of objectives for ranking the plurality of vulnerabilities;
determining an initial population of individual solutions for addressing at least some of the plurality of vulnerabilities;
performing a multi-objective optimization that modifies the initial population of individual solutions for addressing at least some of the plurality of vulnerabilities to obtain a revised population comprising a Pareto front of individual solutions for addressing at least some of the plurality of vulnerabilities, wherein each of the individual solutions in the revised population comprises: (i) a vector having a ranked position for each of the at least some of the plurality of vulnerabilities, (ii) one or more mitigation actions to address one or more of the plurality of vulnerabilities, and (iii) at least one fitness score, obtained using a fitness function, that characterizes a quality of the respective individual solution for at least some of the plurality of objectives, wherein one or more of the at least some of the plurality of vulnerabilities are mitigated in an order based at least in part on the ranked position for the respective individual solution;

selecting at least one of the individual solutions in the revised population based at least in part on the at least one fitness score associated with the at least one individual solution; and initiating at least one mitigation action to address one or more of the plurality of vulnerabilities in the selected at least one individual solution using the ranked position of the at least some of the plurality of vulnerabilities for the selected at least one individual solution.

18. The non-transitory processor-readable storage medium of claim 17, further comprising merging duplicate occurrences of at least one vulnerability in the plurality of vulnerabilities into a single vulnerability occurrence prior to performing the multi-objective optimization to modify the initial population of individual solutions and expanding the single vulnerability occurrence into the duplicate occurrences following the obtaining of the revised population of individual solutions.

19. The non-transitory processor-readable storage medium of claim 17, further comprising performing a target-based search to identify the plurality of vulnerabilities in at least one of the individual solutions in the revised population to address in order to satisfy a target value.

20. The non-transitory processor-readable storage medium of claim 17, further comprising assigning a score to at least some of the individual solutions in the revised population using a scalarization approach based at least in part on a weighting of at least some of the plurality of objectives, wherein the weighting of at least some of the plurality of objectives comprises a weighted sum of each of the at least some of the plurality of objectives, wherein the weighted sum of a given objective is based at least in part on an importance weight of the given objective, and wherein a new weighting of at least some of the plurality of objectives is determined in response to a change in at least one importance weight associated with the plurality of objectives.

* * * * *